(12) United States Patent
Porter et al.

(10) Patent No.: US 7,636,453 B2
(45) Date of Patent: Dec. 22, 2009

(54) OBJECT DETECTION

(75) Inventors: Robert Mark Stefan Porter, Winchester (GB); Ratna Rambaruth, Guildford (GB); Simon Dominic Haynes, Basingstoke (GB); Jonathan Living, Near Stourbridge (GB); Clive Henry Gillard, Alton (GB)

(73) Assignee: Sony United Kingdom Limited, Weybridge (GB)

( * ) Notice: Subject to any disclaimer, the term of this patent is extended or adjusted under 35 U.S.C. 154(b) by 881 days.

(21) Appl. No.: 11/138,136

(22) Filed: May 26, 2005

(65) Prior Publication Data

US 2005/0265581 A1  Dec. 1, 2005

(30) Foreign Application Priority Data

May 28, 2004  (GB) ................... 0412026.7

(51) Int. Cl.
*G06K 9/00* (2006.01)
(52) U.S. Cl. .................. 382/103; 382/219; 382/278; 348/169
(58) Field of Classification Search .................. 382/103, 382/107, 219, 218, 278; 348/14.1, 14.15, 348/169
See application file for complete search history.

(56) References Cited

U.S. PATENT DOCUMENTS

| 5,363,297 | A   |     | 11/1994 | Larson et al. |          |
|-----------|-----|-----|---------|---------------|----------|
| 6,359,647 | B1  | *   | 3/2002  | Sengupta et al. | 348/154 |
| 6,545,706 | B1  | *   | 4/2003  | Edwards et al. | 348/169 |
| 6,980,697 | B1  | *   | 12/2005 | Basso et al.  | 382/274  |
| 7,019,644 | B2  | *   | 3/2006  | Barrie        | 340/539.13 |
| 7,023,454 | B1  | *   | 4/2006  | Knight        | 345/646  |
| 7,023,469 | B1  | *   | 4/2006  | Olson         | 348/152  |

FOREIGN PATENT DOCUMENTS

| EP | 1 225 518    | 1/2003 |
|----|--------------|--------|
| WO | WO 02/37415  | 5/2002 |
| WO | WO 2004/051551 | 6/2004 |

OTHER PUBLICATIONS

H. Schneiderman and T. Kanade, "A statistical model for 3D object detection applied to faces and cars," IEEE Conference on Computer Vision and Pattern Recognition, 2000.
H. Schneiderman and T. Kanade, "Probabilistic modelling of local appearance spatial relationships for object recognition," IEEE Conference on Computer Vision and Pattern Recognition, 1998.
H. Schneiderman, "A statistical approach to 3D object detection applied to faces and cars," PhD thesis, Robotics Institute, Carnegie Mellon University, 2000.

* cited by examiner

*Primary Examiner*—Yosef Kassa
(74) *Attorney, Agent, or Firm*—Oblon, Spivak, McClelland, Maier & Neustadt, L.L.P.

(57) ABSTRACT

A video data processing apparatus, that processes video data including a sequence of images, the apparatus including: an object tracker unit configured to detect a presence of one or more objects within an image and to track a detected object across successive images; an identity association unit configured to associate an identity with an object tracked by the object tracker unit; a counter unit configured to, for a first and second identity, count a number of images within which a tracked object associated with the first identity and a tracked object associated with the second identity have both been detected; and a similarity detector unit configured to determine whether two tracked objects are similar in appearance.

18 Claims, 11 Drawing Sheets

OBJECT DETECTION

BACKGROUND OF THE INVENTION

1. Field of the Invention

This invention relates to object detection.

2. Description of the Prior Art

Many object detection algorithms, such as human-face detection algorithms, have been proposed in the literature, including the use of so-called eigenfaces, face template matching, deformable template matching or neural network classification. None of these is perfect, and each generally has associated advantages and disadvantages. None gives an absolutely reliable indication that an image contains a face; on the contrary, they are all based upon a probabilistic assessment, based on a mathematical analysis of the image, of whether the image has at least a certain likelihood of containing a face. The algorithms generally have a threshold likelihood value that is usually set quite high to try to avoid false detections of faces.

Face detection in video material, comprising a sequence of captured images, is a more complicated than detecting a face in a still image. It is often desirable to be able to "track" a face through a sequence of images so that its movement may be determined and a corresponding so-called "face-track" may be produced. This allows, for example, a face detected in consecutive images to be linked to the same person. One way of attempting to track faces through a sequence of images is to check whether two faces in adjacent images have the same or very similar image positions. However, this approach can suffer problems because of the probabilistic nature of the face detection schemes. On the one hand, if the threshold likelihood (for a face detection to be made) is set high, there may be some images in the sequence where a face is present but is not detected by the algorithm, for example because the owner of that face turns his head to the side, or his face is partially obscured, or he scratches his nose, or one of many possible reasons. On the other hand, if the threshold likelihood value is set low, the proportion of false detections will increase and it is possible for an object which is not a face to be successfully tracked through a whole sequence of images.

Whilst processing a video sequence, a face tracking algorithm may track many detected faces and produce corresponding face-tracks. It is common for several face-tracks to actually correspond to the same face. As mentioned above, this could be due, for example, to the owner of the face turning his head to one side and then turning his head back. The face tracking algorithm may not be able to detect the face whilst it is turned to one side. This results in a face-track for the face prior to the owner turning his head to one side and a separate face-track for the same face after the owner has turned his head back. This may be done many times, resulting in two or more face-tracks for that particular face. As another example, a person may enter and leave a scene in the video sequence several times, this resulting in a corresponding number of face-tracks for the same face.

SUMMARY OF THE INVENTION

According to one aspect of the invention, there is provided video data processing apparatus, the video data comprising a sequence of images, the apparatus comprising:

an object tracker operable to detect the presence of one or more objects within an image and to track a detected object across successive images;

an identity associator operable to associate an identity with an object tracked by the object tracker;

a counter operable, for a first and second identity, to count the number of images within which a tracked object associated with the first identity and a tracked object associated with the second identity have both been detected; and a similarity detector operable to determine whether two tracked objects are similar in appearance;

the identity associator being operable to change the identity associated with a first tracked object to the identity associated with a second tracked object if:

(a) the similarity detector determines that the first and second tracked objects are similar in appearance and (b) the count corresponding to the identities associated with the first and second tracked objects, as counted by the counter, is less than a predetermined threshold.

The invention recognises that it is desirable to be able to associate multiple face-tracks with a single person/identity when the face-tracks actually correspond to the same face. This can lead, for example, to a more accurate analysis of the number of distinct faces occurring in the video sequence. However, this should preferably be done in a manner that avoids, where possible, associating a face-track originating from one person with the identity of a different person. This may be particularly difficult to achieve when two people with similar looking faces occur in the video sequence.

Embodiments of the invention have the advantage that two face-tracks can be associated with the same identity when (a) the faces identified in the two face-tracks are similar in appearance and (b) the two face-tracks have not overlapped (or have only briefly overlapped) during the video sequence. Condition (b) relies on the fact that, if two faces are detected in the same image, then they cannot logically belong to the same person.

The skilled man will of course appreciate that references to "first" and "second" tracked objects does not refer to the temporal order in which the objects were tracked or were first detected, but is rather just terminology to allow two tracks to be distinguished in the text.

Various further respective aspects and features of the invention are defined in the appended claims.

The above and other objects, features and advantages of the invention will be apparent from the following detailed description of illustrative embodiments which is to be read in connection with the accompanying drawings, in which.

Figure 3:
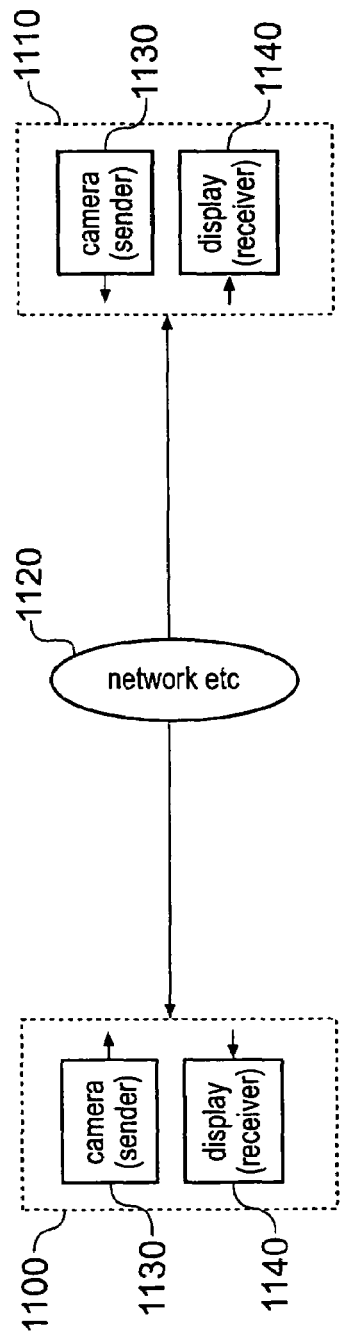
Figure 4:
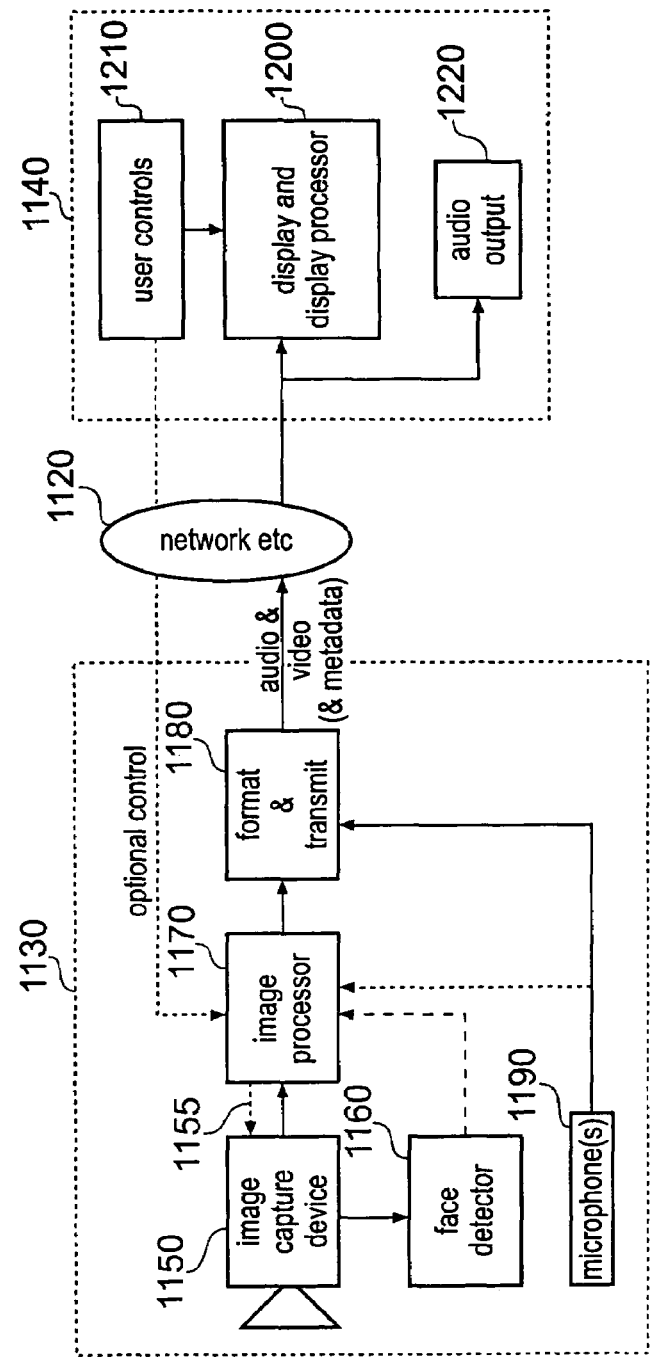
Figure 5:
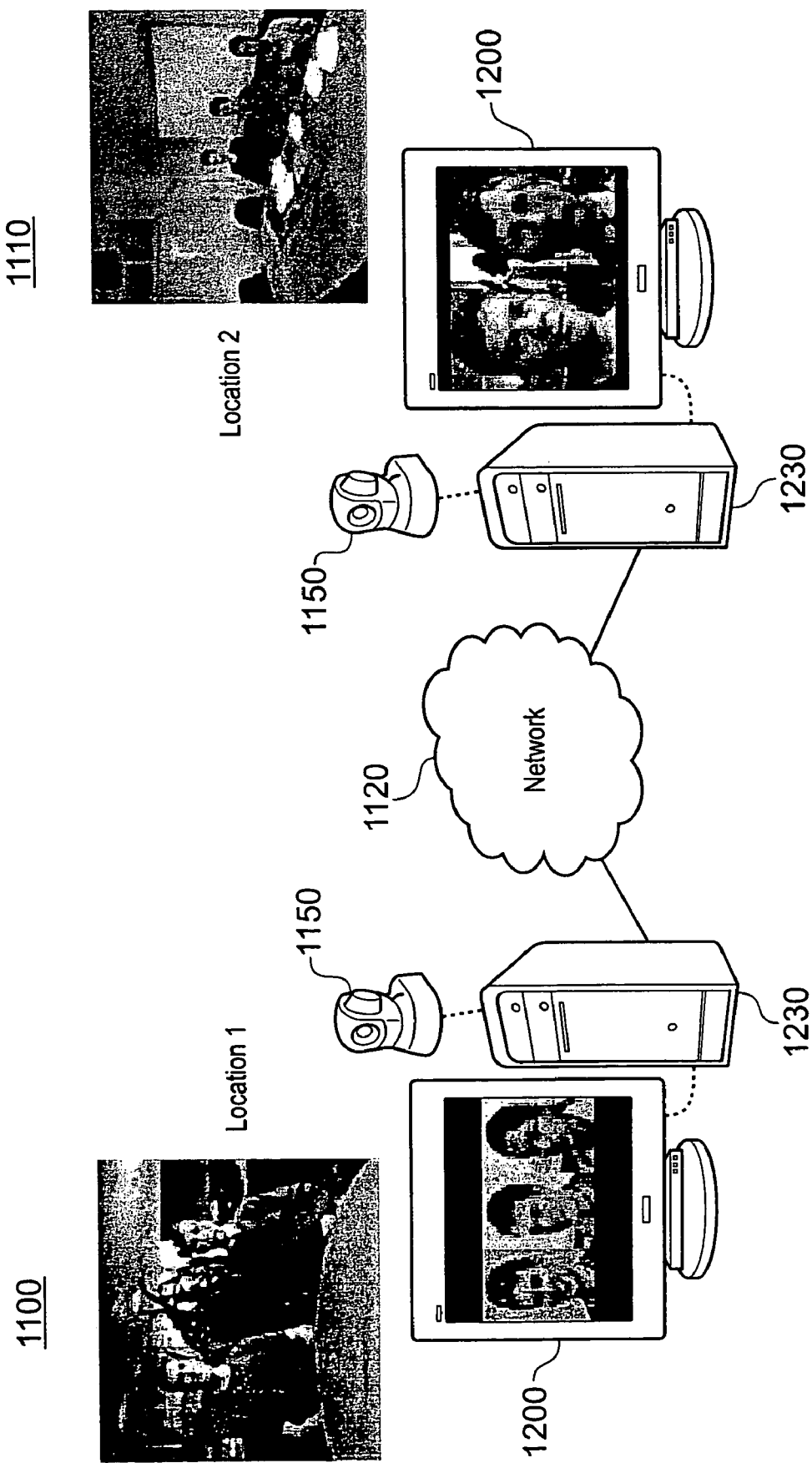
Figure 6:
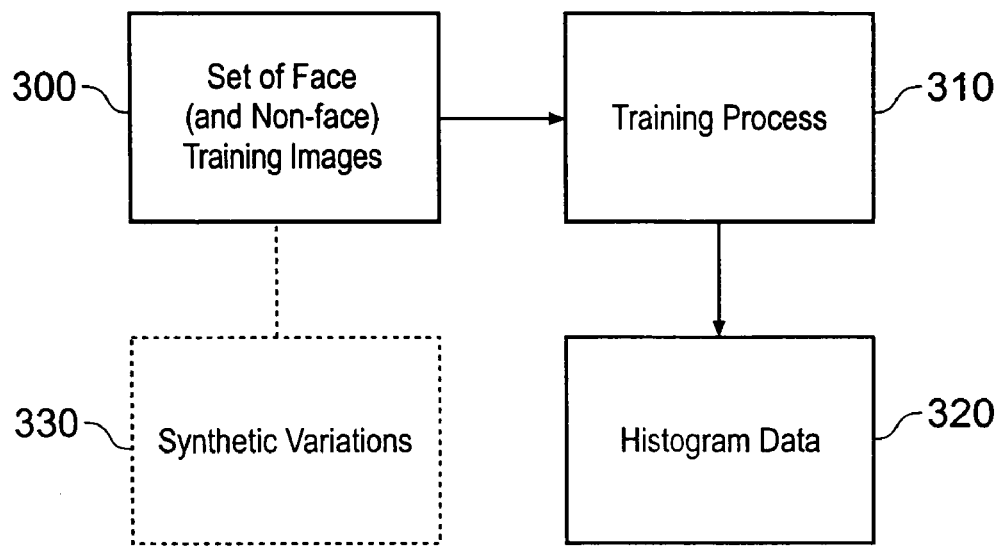
Figure 7:
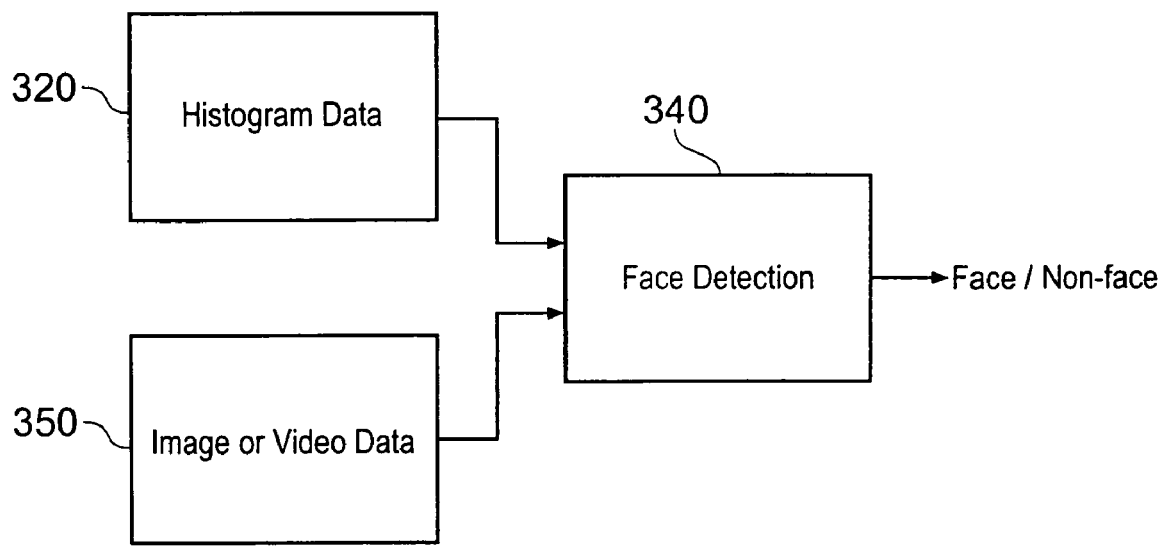
Figure 8:
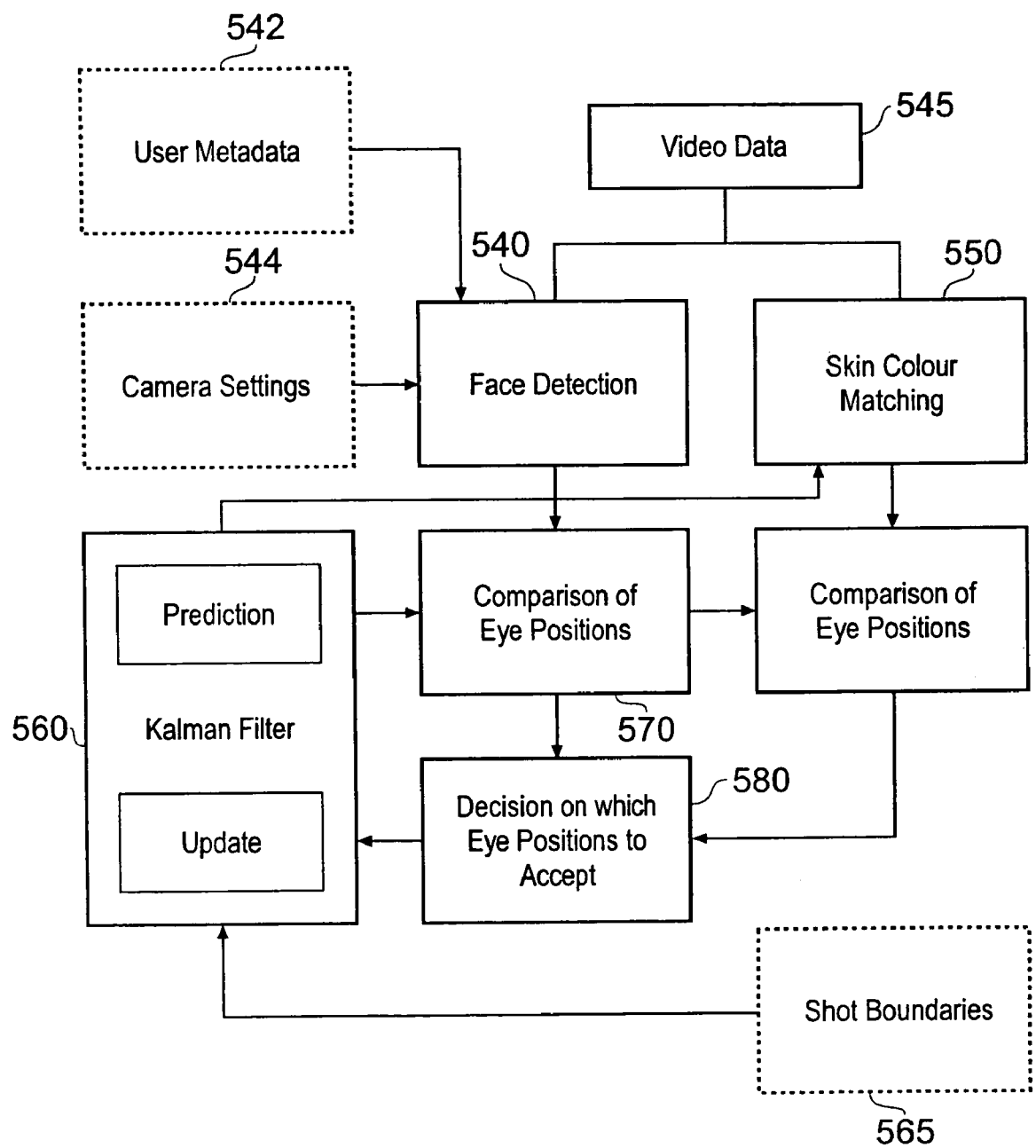
Figure 9A:
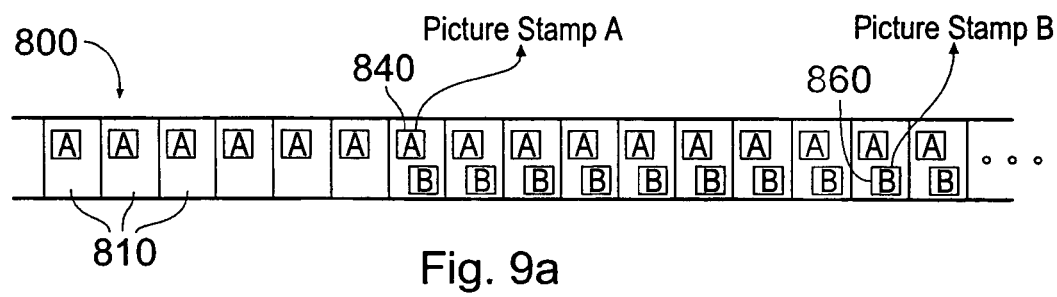
Figure 9B:
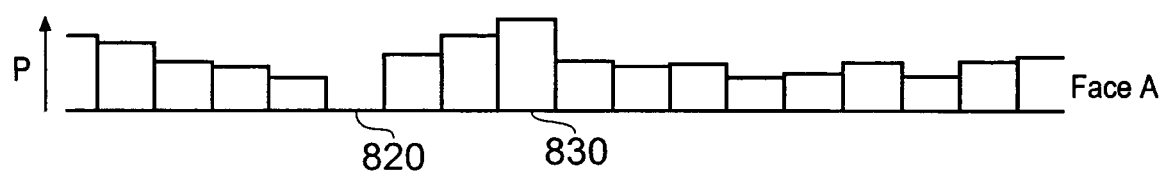
Figure 9C:
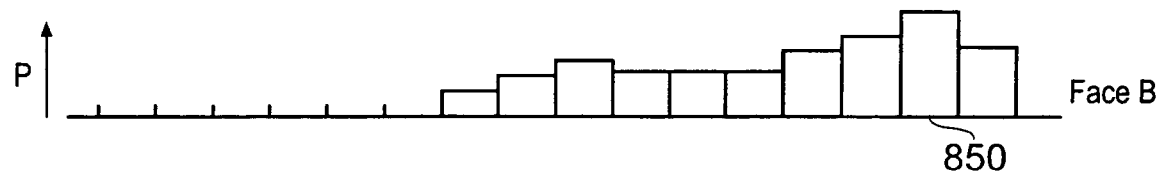
Figure 10:
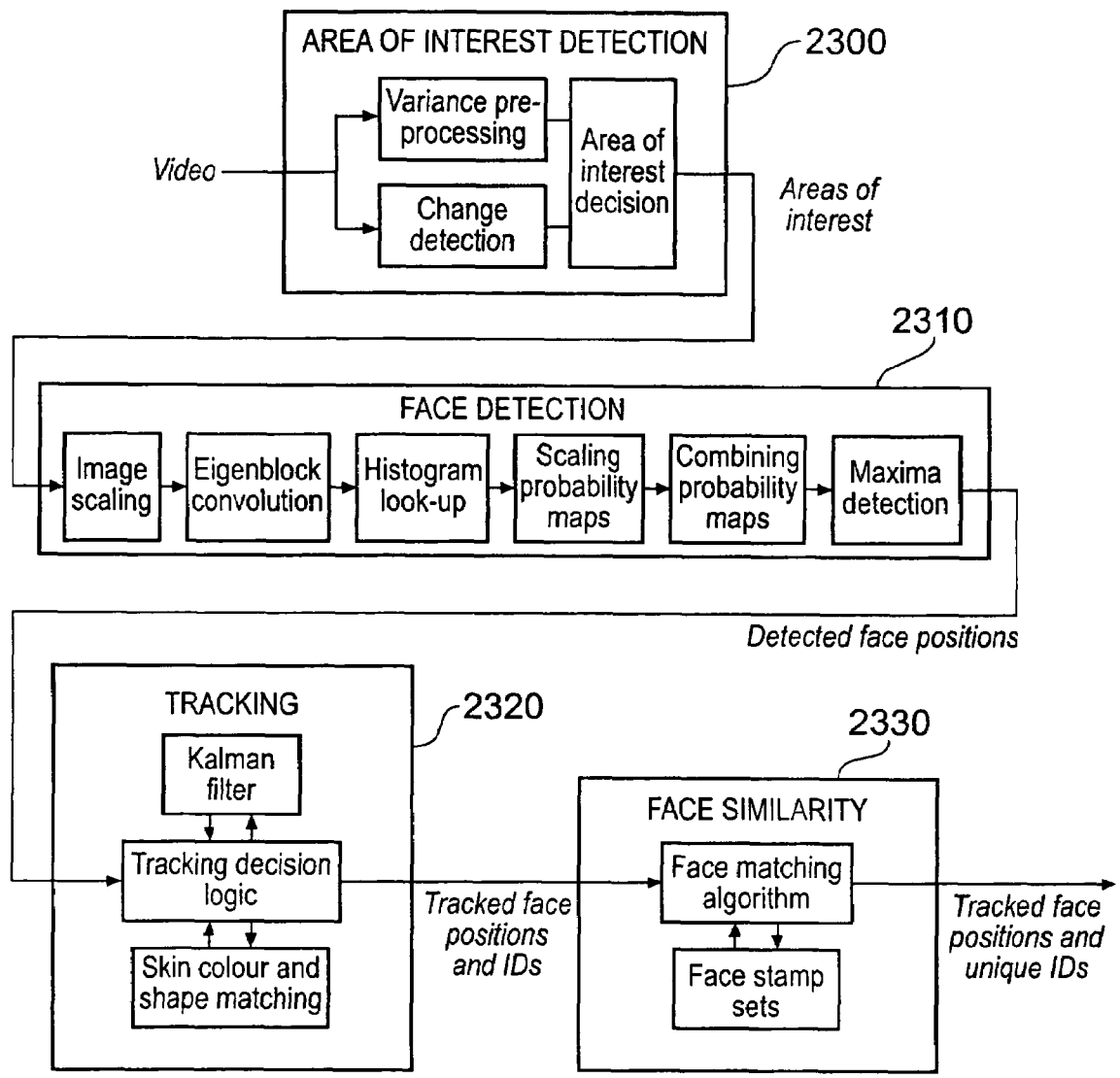
Figure 11:
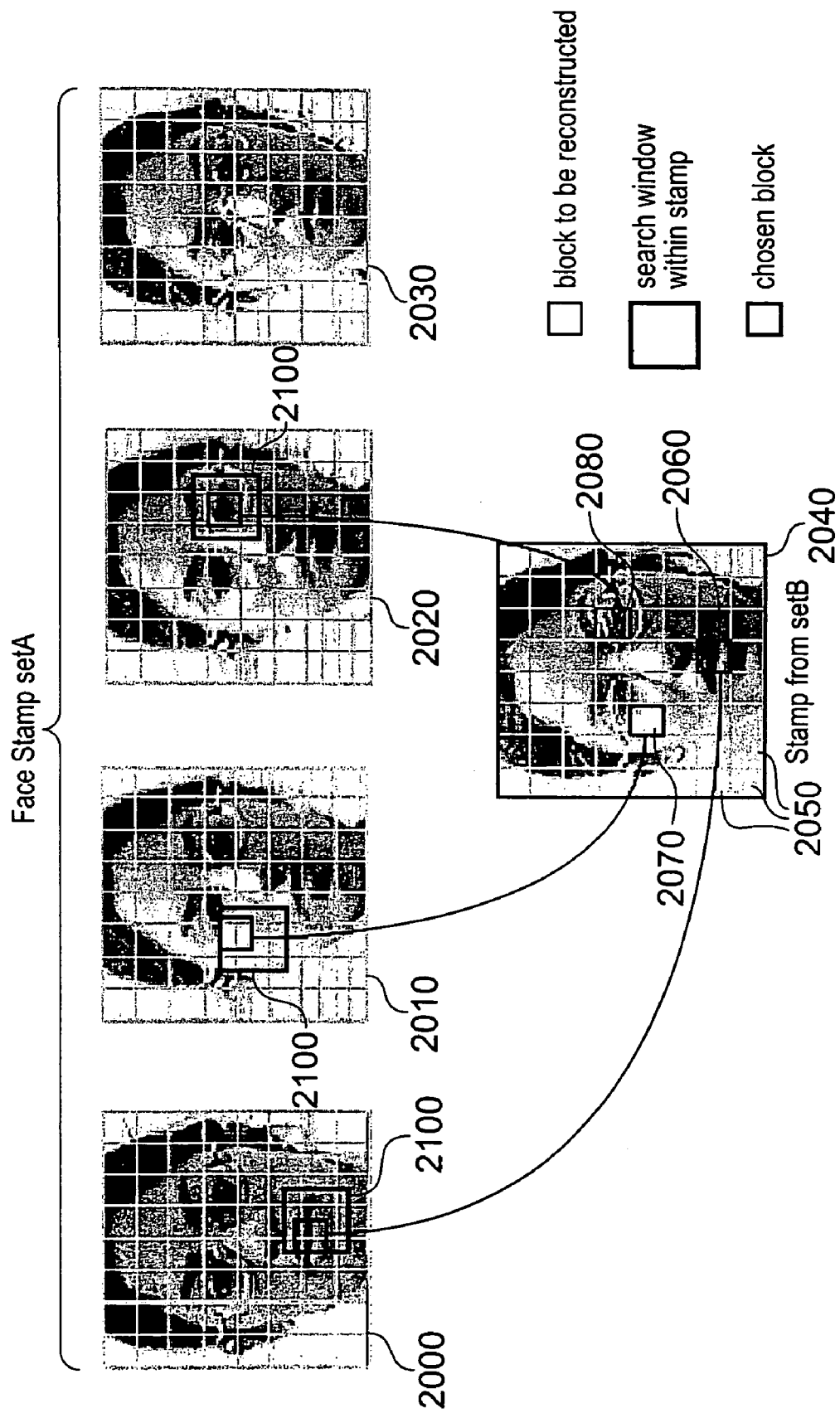
Figure 12:
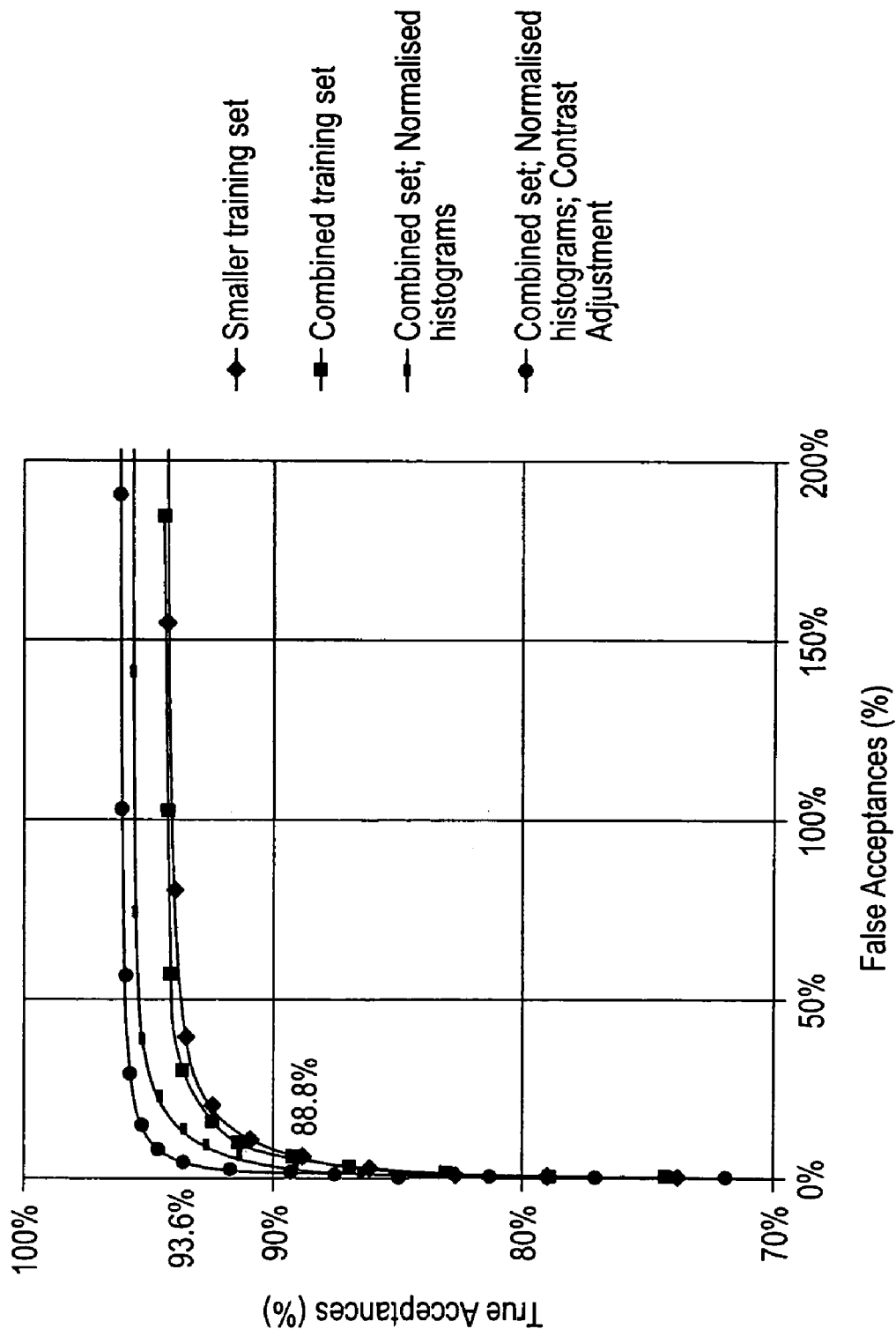
Figure 13A:
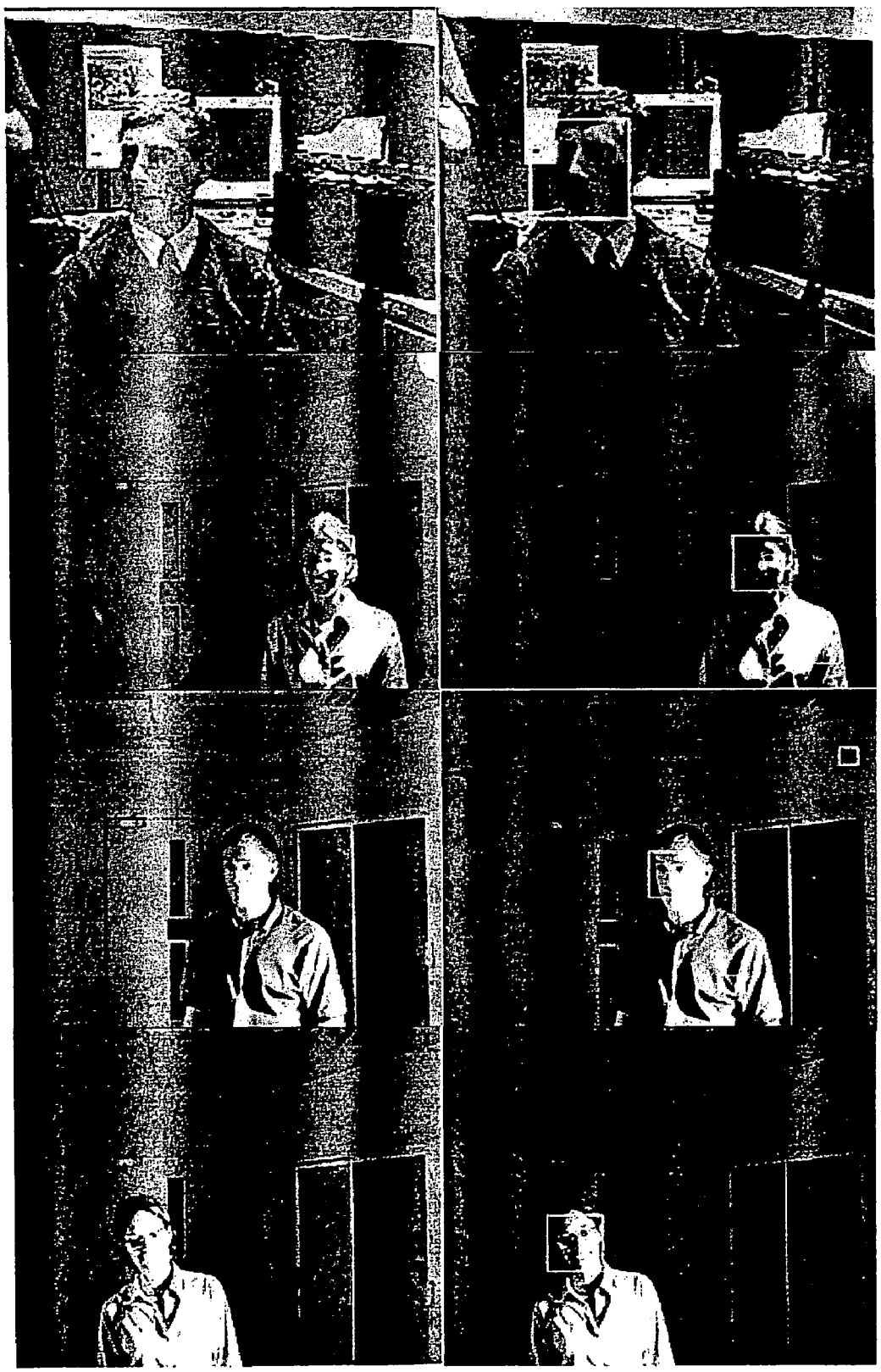
Figure 13B:

FIG. 3 schematically illustrates a video conferencing system;

FIGS. 4 and 5 schematically illustrate a video conferencing system in greater detail;

FIG. 6 is a schematic diagram illustrating a training process;

FIG. 7 is a schematic diagram illustrating a detection process;

FIG. 8 schematically illustrates a face tracking algorithm;

FIGS. 9a to 9c schematically illustrate the use of face tracking when applied to a video scene;

FIG. 10 is a schematic diagram of a face detection and tracking system;

FIG. 11 schematically illustrates a similarity detection technique;

FIG. 12 schematically illustrates system performance for different training sets; and FIGS. 13a and 13b schematically illustrate trial results.

DESCRIPTION OF THE PREFERRED EMBODIMENTS

The description of FIGS. 1 to 9c summarises the teaching of application number PCT/GB2003/005186. Reference is made to that application for fuller details of the technical features summarised here. Features disclosed in PCT/GB2003/005186 which are not explicitly referred to in the following summary description should still be considered as (at least optional) features of the present detection arrangement.

The following description will refer to face detection and/or tracking as aims of the various techniques. However, it should be appreciated that the techniques are applicable to detecting and/or tracking many different types of objects. An example is that of detecting cars. Accordingly, the references to faces are merely to provide a framework to make the description easier to follow. The term "face" is not necessarily to be taken as implying any limitation in the description that follows.

Figure 1:
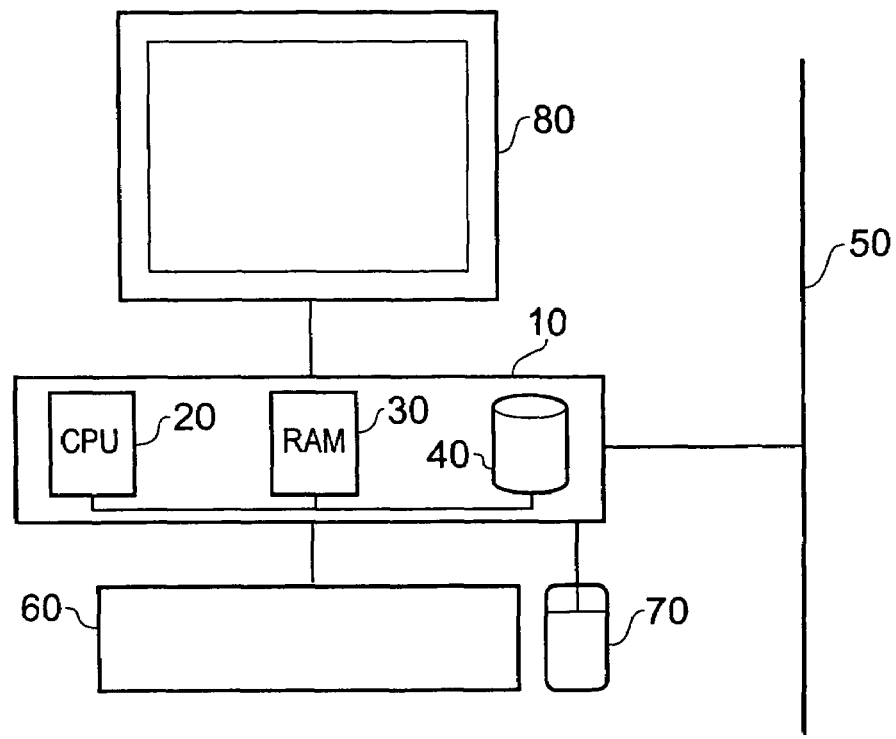
FIG. 1 is a schematic diagram of a general purpose computer system for use as a face detection system and/or a non-linear editing system.

FIG. 1 is a schematic diagram of a general purpose computer system for use as a face detection system and/or a non-linear editing system. The computer system comprises a processing unit 10 having (amongst other conventional components) a central processing unit (CPU) 20, memory such as a random access memory (RAM) 30 and non-volatile storage such as a disc drive 40. The computer system may be connected to a network 50 such as a local area network or the Internet (or both). A keyboard 60, mouse or other user input device 70 and display screen 80 are also provided. The skilled man will appreciate that a general purpose computer system may include many other conventional parts which need not be described here.

Figure 2:
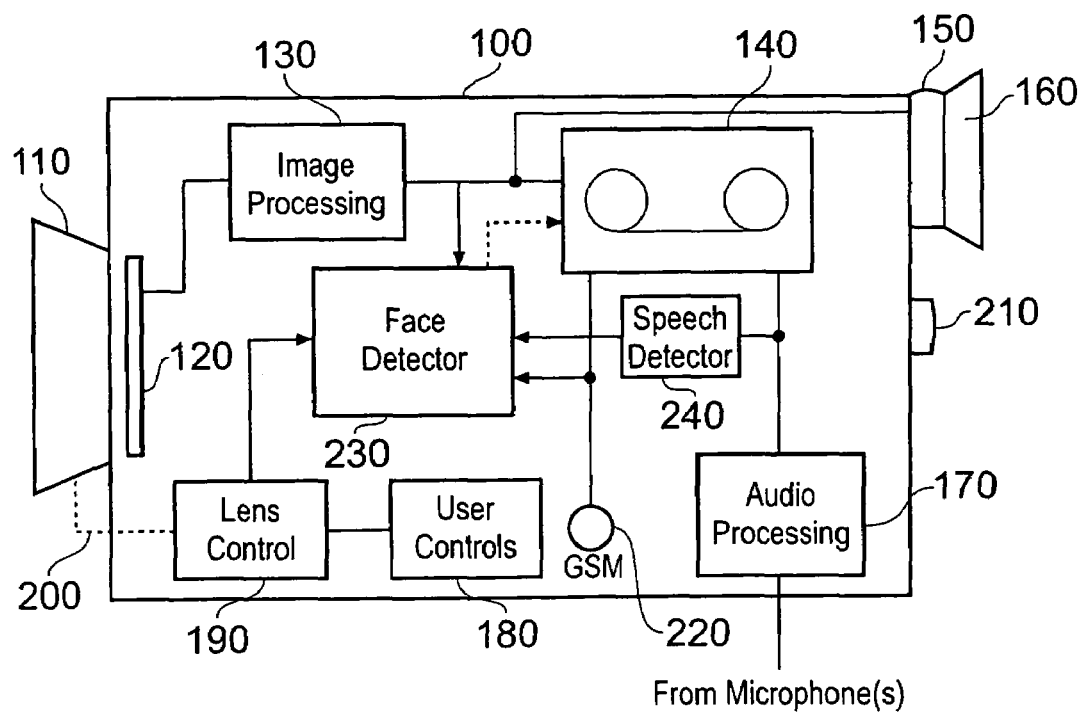
FIG. 2 is a schematic diagram of a video camera-recorder (camcorder) using face detection.

FIG. 2 is a schematic diagram of a video camera-recorder (camcorder) using face detection. The camcorder 100 comprises a lens 110 which focuses an image onto a charge coupled device (CCD) image capture device 120. The resulting image in electronic form is processed by image processing logic 130 for recording on a recording medium such as a tape cassette 140. The images captured by the device 120 are also displayed on a user display 150 which may be viewed through an eyepiece 160.

To capture sounds associated with the images, one or more microphones are used. These may be external microphones, in the sense that they are connected to the camcorder by a flexible cable, or may be mounted on the camcorder body itself. Analogue audio signals from the microphone (s) are processed by an audio processing arrangement 170 to produce appropriate audio signals for recording on the storage medium 140.

It is noted that the video and audio signals may be recorded on the storage medium 140 in either digital form or analogue form, or even in both forms. Thus, the image processing arrangement 130 and the audio processing arrangement 170 may include a stage of analogue to digital conversion.

The camcorder user is able to control aspects of the lens 110's performance by user controls 180 which influence a lens control arrangement 190 to send electrical control signals 200 to the lens 110. Typically, attributes such as focus and zoom are controlled in this way, but the lens aperture or other attributes may also be controlled by the user.

Two further user controls are schematically illustrated. A push button 210 is provided to initiate and stop recording onto the recording medium 140. For example, one push of the control 210 may start recording and another push may stop recording, or the control may need to be held in a pushed state for recording to take place, or one push may start recording for a certain timed period, for example five seconds. In any of these arrangements, it is technologically very straightforward to establish from the camcorder's record operation where the beginning and end of each "shot" (continuous period of recording) occurs.

The other user control shown schematically in FIG. 2 is a "good shot marker" (GSM) 220, which may be operated by the user to cause "metadata" (associated data) to be stored in connection with the video and audio material on the recording medium 140, indicating that this particular shot was subjectively considered by the operator to be "good" in some respect (for example, the actors performed particularly well; the news reporter pronounced each word correctly; and so on).

The metadata may be recorded in some spare capacity (e.g. "user data") on the recording medium 140, depending on the particular format and standard in use. Alternatively, the metadata can be stored on a separate storage medium such as a removable MemoryStick$^{RTM}$ memory (not shown), or the metadata could be stored on an external database (not shown), for example being communicated to such a database by a wireless link (not shown). The metadata can include not only the GSM information but also shot boundaries, lens attributes, alphanumeric information input by a user (e.g. on a keyboard—not shown), geographical position information from a global positioning system receiver (not shown) and so on.

So far, the description has covered a metadata-enabled camcorder. Now, the way in which face detection may be applied to such a camcorder will be described.

The camcorder includes a face detector arrangement 230. Appropriate arrangements will be described in much greater detail below, but for this part of the description it is sufficient to say that the face detector arrangement 230 receives images from the image processing arrangement 130 and detects, or attempts to detect, whether such images contain one or more faces. The face detector may output face detection data which could be in the form of a "yes/no" flag or may be more detailed in that the data could include the image co-ordinates of the faces, such as the co-ordinates of eye positions within each detected face. This information may be treated as another type of metadata and stored in any of the other formats described above.

As described below, face detection may be assisted by using other types of metadata within the detection process. For example, the face detector 230 receives a control signal from the lens control arrangement 190 to indicate the current focus and zoom settings of the lens 110. These can assist the face detector by giving an initial indication of the expected image size of any faces that may be present in the foreground of the image. In this regard, it is noted that the focus and zoom settings between them define the expected separation between the camcorder 100 and a person being filmed, and also the magnification of the lens 110. From these two attributes, based upon an average face size, it is possible to calculate the expected size (in pixels) of a face in the resulting image data.

A conventional (known) speech detector 240 receives audio information from the audio processing arrangement 170 and detects the presence of speech in such audio information. The presence of speech may be an indicator that the likelihood of a face being present in the corresponding images is higher than if no speech is detected.

Finally, the GSM information 220 and shot information (from the control 210) are supplied to the face detector 230, to indicate shot boundaries and those shots considered to be most useful by the user.

Of course, if the camcorder is based upon the analogue recording technique, further analogue to digital converters (ADCs) may be required to handle the image and audio information.

As a further example of the use of these detection techniques, FIG. 3 schematically illustrates a video conferencing system. Two video conferencing stations 1100, 1110 are connected by a network connection 1120 such as: the Internet, a local or wide area network, a telephone line, a high bit rate leased line, an ISDN line etc. Each of the stations comprises, in simple terms, a camera and associated sending apparatus 1130 and a display and associated receiving apparatus 1140. Participants in the video conference are viewed by the camera at their respective station and their voices are picked up by one or more microphones (not shown in FIG. 3) at that station. The audio and video information is transmitted via the network 1120 to the receiver 1140 at the other station. Here, images captured by the camera are displayed and the participants' voices are produced on a loudspeaker or the like.

It will be appreciated that more than two stations may be involved in the video conference, although the discussion here will be limited to two stations for simplicity.

FIG. 4 schematically illustrates one channel, being the connection of one camera/sending apparatus to one display/receiving apparatus.

At the camera/sending apparatus, there is provided a video camera 1150, a face detector 1160 using the techniques described above, an image processor 1170 and a data formatter and transmitter 1180. A microphone 1190 detects the participants' voices.

Audio, video and (optionally) metadata signals are transmitted from the formatter and transmitter 1180, via the network connection 1120 to the display/receiving apparatus 1140. Optionally, control signals are received via the network connection 1120 from the display/receiving apparatus 1140.

At the display/receiving apparatus, there is provided a display and display processor 1200, for example a display screen and associated electronics, user controls 1210 and an audio output arrangement 1220 such as a digital to analogue (DAC) converter, an amplifier and a loudspeaker.

In general terms, the face detector 1160 detects (and optionally tracks) faces in the captured images from the camera 1150. The face detections are passed as control signals to the image processor 1170. The image processor can act in various different ways, which will be described below, but fundamentally the image processor 1170 alters the images captured by the camera 1150 before they are transmitted via the network 1120. A significant purpose behind this is to make better use of the available bandwidth or bit rate which can be carried by the network connection 1120. Here it is noted that in most commercial applications, the cost of a network connection 1120 suitable for video conference purposes increases with an increasing bit rate requirement. At the formatter and transmitter 1180 the images from the image processor 1170 are combined with audio signals from the microphone 1190 (for example, having been converted via an analogue to digital converter (ADC)) and optionally metadata defining the nature of the processing carried out by the image processor 1170.

FIG. 5 is a further schematic representation of the video conferencing system. Here, the functionality of the face detector 1160, the image processor 1170, the formatter and transmitter 1180 and the processor aspects of the display and display processor 1200 are carried out by programmable personal computers 1230. The schematic displays shown on the display screens (part of 1200) represent one possible mode of video conferencing using face detection and tracking, namely that only those image portions containing faces are transmitted from one location to the other, and are then displayed in a tiled or mosaic form at the other location.

The present embodiment uses a face detection technique arranged as two phases. FIG. 6 is a schematic diagram illustrating a training phase, and FIG. 7 is a schematic diagram illustrating a detection phase.

Unlike some previously proposed face detection methods, the present method is based on modelling the face in parts instead of as a whole. The parts can either be blocks centred over the assumed positions of the facial features (so-called "selective sampling") or blocks sampled at regular intervals over the face (so-called "regular sampling"). The present description will cover primarily regular sampling, as this was found in empirical tests to give the better results.

In the training phase, an analysis process is applied to a set of images known to contain faces, and (optionally) another set of images ("nonface images") known not to contain faces. The process can be repeated for multiple training sets of face data, representing different views (e.g. frontal, left side, right side) of faces. The analysis process builds a mathematical model of facial and nonfacial features, against which a test image can later be compared (in the detection phase).

So, to build the mathematical model (the training process 310 of FIG. 6), the basic steps are as follows:

1. From a set 300 of face images normalised to have the same eye positions, each face is sampled regularly into small blocks.
2. Attributes are calculated for each block;
3. The attributes are quantised to a manageable number of different values.
4. The quantised attributes are then combined to generate a single quantised value in respect of that block position.
5. The single quantised value is then recorded as an entry in a histogram. The collective histogram information 320 in respect of all of the block positions in all of the training images forms the foundation of the mathematical model of the facial features.

One such histogram is prepared for each possible block position, by repeating the above steps in respect of a large number of test face images. So, in a system which uses an array of 8×8 blocks, 64 histograms are prepared. In a later part of the processing, a test quantised attribute is compared with the histogram data; the fact that a whole histogram is used to model the data means that no assumptions have to be made about whether it follows a parameterised distribution, e.g. Gaussian or otherwise. To save data storage space (if needed), histograms which are similar can be merged so that the same histogram can be reused for different block positions.

In the detection phase, to apply the face detector to a test image 350, successive windows in the test image are processed 340 as follows:

6. The window is sampled regularly as a series of blocks, and attributes in respect of each block are calculated and quantised as in stages 1-4 above.
7. Corresponding "probabilities" for the quantised attribute values for each block position are looked up from the corresponding histograms. That is to say, for each block position, a respective quantised attribute is generated and is compared with a histogram previously generated in respect of that block position (or with multiple histograms in the case of multiple training sets representing different views). The way in which the histograms give rise to "probability" data will be described below.
8. All the probabilities obtained above are multiplied together to form a final probability which is compared against a threshold in order to classify the window as "face" or "nonface". It will be appreciated that the detection result of "face" or "nonface" is a probability-based measure rather than an absolute detection. Sometimes, an image not containing a face may be wrongly detected as "face", a so-called false positive. At other times, an image containing a face may be wrongly detected as "nonface", a so-called false negative. It is an aim of any face detection system to reduce the proportion of false positives and the proportion of false negatives, but it is of course understood that to reduce these proportions to zero is difficult, if not impossible, with current technology.

As mentioned above, in the training phase, a set of "nonface" images can be used to generate a corresponding set of "nonface" histograms. Then, to achieve detection of a face, the "probability" produced from the nonface histograms may be compared with a separate threshold, so that the probability has to be under the threshold for the test window to contain a face. Alternatively, the ratio of the face probability to the nonface probability could be compared with a threshold.

Extra training data may be generated by applying "synthetic variations" 330 to the original training set, such as variations in position, orientation, size, aspect ratio, background scenery, lighting intensity and frequency content.

Further improvements to the face detection arrangement will also be described below.

Face Tracking

A face tracking algorithm will now be described. The tracking algorithm aims to improve face detection performance in image sequences.

The initial aim of the tracking algorithm is to detect every face in every frame of an image sequence. However, it is recognised that sometimes a face in the sequence may not be detected. In these circumstances, the tracking algorithm may assist in interpolating across the missing face detections.

Ultimately, the goal of face tracking is to be able to output some useful metadata from each set of frames belonging to the same scene in an image sequence. This might include:
Number of faces.
"Mugshot" (a colloquial word for an image of a person's face, derived from a term referring to a police file photograph) of each face.
Frame number at which each face first appears.
Frame number at which each face last appears.
Identity of each face (either matched to faces seen in previous scenes, or matched to a face database)

The tracking algorithm uses the results of the face detection algorithm, run independently on each frame of the image sequence, as its starting point. Because the face detection algorithm may sometimes miss (not detect) faces, some method of interpolating the missing faces is useful. To this end, a Kalman filter is used to predict the next position of the face and a skin colour matching algorithm was used to aid tracking of faces. In addition, because the face detection algorithm often gives rise to false acceptances, some method of rejecting these is also useful.

The algorithm is shown schematically in FIG. 8.

In summary, input video data 545 (representing the image sequence) is supplied to a face detector of the type described in this application, and a skin colour matching detector 550. The face detector attempts to detect one or more faces in each image. When a face is detected, a Kalman filter 560 is established to track the position of that face. The Kalman filter generates a predicted position for the same face in the next image in the sequence. An eye position comparator 570, 580 detects whether the face detector 540 detects a face at that position (or within a certain threshold distance of that position) in the next image. If this is found to be the case, then that detected face position is used to update the Kalman filter and the process continues.

If a face is not detected at or near the predicted position, then a skin colour matching method 550 is used. This is a less precise face detection technique which is set up to have a lower threshold of acceptance than the face detector 540, so that it is possible for the skin colour matching technique to detect (what it considers to be) a face even when the face detector cannot make a positive detection at that position. If a "face" is detected by skin colour matching, its position is passed to the Kalman filter as an updated position and the process continues.

If no match is found by either the face detector 450 or the skin colour detector 550, then the predicted position is used to update the Kalman filter.

All of these results are subject to acceptance criteria (see below). So, for example, a face that is tracked throughout a sequence on the basis of one positive detection and the remainder as predictions, or the remainder as skin colour detections, will be rejected.

A separate Kalman filter is used to track each face in the tracking algorithm.

It is noted that the tracking process is not limited to tracking through a video sequence in a forward temporal direction. Assuming that the image data remain accessible (i.e. the process is not real-time, or the image data are buffered for temporary continued use), the entire tracking process could be carried out in a reverse temporal direction. Or, when a first face detection is made (often part-way through a video sequence) the tracking process could be initiated in both temporal directions. As a further option, the tracking process could be run in both temporal directions through a video sequence, with the results being combined so that (for example) a tracked face meeting the acceptance criteria is included as a valid result whichever direction the tracking took place.

Advantages of the Tracking Algorithm

The face tracking technique has three main benefits:
It allows missed faces to be filled in by using Kalman filtering and skin colour tracking in frames for which no face detection results are available. This increases the true acceptance rate across the image sequence.
It provides face linking: by successfully tracking a face, the algorithm automatically knows whether a face detected in a future frame belongs to the same person or a different person. Thus, scene metadata can easily be generated from this algorithm, comprising the number of faces in the scene, the frames for which they are present and providing a representative mugshot of each face.
False face detections tend to be rejected, as such detections tend not to carry forward between images.

FIGS. 9a to 9c schematically illustrate the use of face tracking when applied to a video scene.

In particular, FIG. 9a schematically illustrates a video scene 800 comprising successive video images (e.g. fields or frames) 810.

In this example, the images 810 contain one or more faces. In particular all of the images 810 in the scene include a face A, shown at an upper left-hand position within the schematic representation of the image 810. Also, some of the images include a face B shown schematically at a lower right hand position within the schematic representations of the images 810.

A face tracking process is applied to the scene of FIG. 9a. Face A is tracked reasonably successfully throughout the scene. In one image 820 the face is not tracked by a direct detection, but the skin colour matching techniques and the Kalman filtering techniques described above mean that the detection can be continuous either side of the "missing" image 820. The representation of FIG. 9b indicates the detected probability of face A being present in each of the images, and FIG. 9c shows the corresponding probability values for face B. To distinguish between the track for face A and the track for face B, unique (at least with respect to other tracks in the system) identification numbers are assigned to each track.

In the system described above and in PCT/GB2003/005186, during face detection and tracking, a person's track is terminated if the face turns away from the camera for a prolonged period of time or disappears from the scene briefly. On returning to the scene, the face is detected again but a different track is started, and the new track is given a different identification (ID) number.

So-called "face similarity" or "face matching" techniques will now be described.

The aim of face similarity is to recover the identity of the person in these situations, so that an earlier face track and a later face track (relating to the same person) may be linked together. In this arrangement, at least in principle, each person is assigned a unique ID number. When the person returns to the scene, the algorithm attempts to reassign the same ID number by using face matching techniques.

The face similarity method is based on comparing several face "stamps" (images selected to be representative of that tracked face) of a newly encountered individual to several face stamps of previously encountered individuals. Note that face stamps need not be square. Several face stamps belonging to one individual are obtained from the face detection and tracking component of the system. As described above, the face tracking process temporally links detected faces, such that their identity is maintained throughout the sequence of video frames as long as the person does not disappear from the scene or turn away from the camera for too long. Thus the face detections within such a track are assumed to belong to the same person and face stamps within that track can be used as a face stamp "set" for one particular individual.

A fixed number of face stamps is kept in each face stamp set. The way in which face stamps are selected from a track is described below. Then, a "similarity measure" of two face stamp sets will be described. There will then follow a description of how the similarity method is used within the face detection and tracking system. But first, FIG. 10 will be described, in order to place the face similarity techniques into the context of the overall tracking system.

FIG. 10 schematically illustrates a face detection and tracking system, as described above, but placing the face similarity functionality into a technical context. This diagram summarises the process described above and in PCT/GB2003/005186.

At a first stage 2300, so-called "area of interest" logic derives those areas within an image at which face detection is to take place. At those areas of interest, face detection 2310 is carried out to generate detected face positions. Then face tracking 2320 is carried out to generate tracked face positions and IDs. Finally, the face similarity function 2330 is used to match face stamp sets.

Selection of Stamps for the Face Stamp Set

In order to create and maintain a face stamp set, a fixed number (n) of stamps is selected from a temporally linked track of face stamps. The criteria for selection are as follows:
1. The stamp has to have been generated directly from face detection, not from colour tracking or Kalman tracking. In addition, it is only selected if it was detected using histogram data generated from a "frontal view" face training set.

2. Once the first n stamps have been gathered (by following, for example, a forward temporal order through the images constituting the face track), the similarity (see below) of each new stamp available from the track (in the temporal order) with the existing face stamp set is measured. The similarity of each face stamp in the track with the remaining stamps in the stamp set is also measured and stored. If the newly available face stamp is less similar to the face stamp set than an existing element of the face stamp set is to the face stamp set, that existing element is disregarded and the new face stamp is included in the face stamp set. Stamps are chosen in this way so that, by the end of the selection process, the largest amount of variation available is incorporated within the face stamp set. This tends to make the face stamp set more representative for the particular individual.

If fewer than n stamps are gathered for one face stamp set, this face stamp set is not used for similarity assessment as it probably does not contain much variation and is therefore not likely to be a good representation of the individual.

This technique has applications not only in the face similarity algorithm, but also in selecting a set of representative pictures stamps of any object for any application.

A good example is in so-called face logging. There may be a requirement to represent a person who has been detected and logged walking past a camera. A good way to do this is to use several pictures stamps. Ideally, these pictures stamps should be as different from each other as possible, such that as much variation as possible is captured. This would give a human user or automatic face recognition algorithm as much chance as possible of recognising the person.

Similarity Measure

In comparing two face tracks, to detect whether they represent the same individual, a measure of similarity between the face stamp set of a newly encountered individual (setB) and that of a previously encountered individual (setA) is based on how well the stamps in face stamp setB can be reconstructed from face stamp setA. If the face stamps in setB can be reconstructed well from face stamps in setA, then it is considered highly likely that the face stamps from both setA and setB belong to the same individual and thus it can be said that the newly encountered person has been detected before.

The same technique is applied to the arrangement described above, namely the selection of face images for use as a face stamp set representing a particular face track. In that case, the similarity between each newly encountered candidate face stamp and the existing stamps in the set, and the mutual similarity between stamps within the existing set, would be considered in the same way as a the similarity between a stamp from setB and stamps from setA in the description that follows.

A stamp in face stamp setB is reconstructed from stamps in setA in a block-based fashion. This process is illustrated schematically in FIG. 11.

FIG. 11 schematically shows a face stamp setA having four face stamps 2000, 2010, 2020, 2030. (Of course it will be understood that the number four is chosen merely for clarity of the diagram, and that the skilled person could select a different number for an actual implementation). A stamp 2040 from face stamp setB is to be compared with the four stamps of setA.

Each non-overlapping block 2050 in the face stamp 2040 is replaced with a block chosen from a stamp in face stamp setA. The block can be chosen from any stamp in setA and from any position in the stamp within a neighbourhood or search window 2100 of the original block position. The block within these positions which gives the smallest mean squared error (MSE) is chosen to replace the block being reconstructed by using a motion estimation method. (A good motion estimation technique to use is one which gives the lowest mean squared error in the presence of lighting variations while using a small amount of processing power). Note that the blocks need not be square. In the example shown, a block 2060 is replaced by a nearby block from the stamp 2000; a block 2070 by a block from the face stamp 2010; and a block 2080 by a block from the face stamp 2020, and so on.

When a face stamp is being reconstructed, each block can be replaced by a block from a corresponding neighbourhood in the reference face stamp. But optionally, in addition to this neighbourhood, the best block can also be chosen from a corresponding neighbourhood in the reflected reference face stamp. This can be done because faces are roughly symmetrical. In this way, more variation present in the face stamp set can be utilised.

Each face stamp used is of size 64×64 and is divided into blocks of size 8×8. The face stamps used for the similarity measurement are more tightly cropped than the ones output by the face detection component of the system. This is in order to exclude as much of the background as possible from the similarity measurement.

To crop the image, a reduced size is selected (or predetermined)—for example 50 pixels high by 45 pixels wide (allowing for the fact that most faces are not square). The group of pixels corresponding to a central area of this size are then resized so that the selected area fills the 64×64 block once again. This involves some straightforward interpolation. The resizing of a central non-square area to fill a square block means that the resized face can look a little stretched.

The choice of a cropping area (e.g. a 50×45 pixel area) can be predetermined or can be selected in response to attributes of the detected face in each instance. Resizing in each case to the 64×64 block means that comparisons of face stamps—whether cropped or not—take place at the same 64×64 size.

Once the whole stamp is reconstructed in this way, the mean squared error between the reconstructed stamp and the stamp from setB is calculated. The lower the mean squared error, the higher the amount of similarity between the face stamp and face stamp setA.

In the case of a comparison between two face stamp set, each stamp in face stamp setB is reconstructed in the same way and the combined mean squared error is used as the similarity measure between the two face stamp sets.

Thus the algorithm makes full use of the fact that several face stamps are available for each person to be matched. Furthermore the algorithm is robust to imprecise registration of faces to be matched.

In the system described above, newly gathered face stamp sets are reconstructed from existing face stamp sets in order to generate a similarity measure. The similarity measure obtained by reconstructing a face stamp set from another face stamp set (A from B) is usually different from when the latter face stamp set is reconstructed from the former one (B from A). Thus, in some cases, an existing face stamp set could give a better similarity measure when reconstructed from a new face stamp set than vice versa, for example if the existing face stamp set were gathered from a very short track. Therefore in order to increase the likelihood of successful merges between similar faces, the two similarity measures can be combined (e.g. averaged).

A further optional variation will now be described. When a face stamp is being reconstructed, each block is replaced by a block of the same size, shape and orientation from the reference face stamp. But if the size and orientation of a subject are different in the two face stamps, these face stamps will not be well reconstructed from each other as blocks in the face stamp being reconstructed will not match well with blocks of the same size, shape and orientation. This problem can be overcome by allowing blocks in the reference face stamp to take any size, shape and orientation. The best block is thus chosen from the reference face stamp by using a high order geometric transformation estimation (e.g. rotation, zoom, amongst others). Alternatively the whole reference face stamp can be rotated and resized prior to reconstructing the face stamp by the basic method.

In order to make the similarity measure slightly more robust to lighting variations, each face stamp is first normalised to have a mean luminance of zero and a variance of one.

Use of Face Similarity Component within the Object Tracking System

It has been seen that object tracking allows a person's identity to be maintained throughout a sequence of video frames as long as he/she does not disappear from the scene. The aim of the face similarity component is to be able to link tracks such that the person's identity is maintained even if he/she temporarily disappears from the scene or turns away from the camera.

During the operation of the face detection and object tracking system, a new face stamp set is initiated each time a new track is started. The new face stamp set is initially given a unique (i.e. new compared to previously tracked sets) ID. As each stamp of the new face stamp set is acquired, its similarity measure ($S_i$) with all the previously gathered face stamp sets is calculated. This similarity measure is used to update the combined similarity measure ($S_i$-1) of the existing elements of the new face stamp set with all the previously gathered face stamp sets in an iterative manner:

$$^jS_i = 0.9 *^j S_i-1 + 0.1 *^j S_i$$

where the superscript j denotes comparison with the previously gathered face stamp set j.

If the similarity of the new face stamp set to a previously encountered face stamp set is above a certain threshold (T) and the number of elements in the new face stamp set is at least n (see above), then the new face stamp set is given the same ID as the previous face stamp set. The two face stamp sets are then merged to produce just one face stamp set containing as much of the variation contained in the two sets as possible by using the same similarity-comparison method as described in the above section.

The new face stamp set is discarded if its track terminates before n face stamps are gathered.

If the similarity measure of the new face stamp set is above the threshold T for more than one stored face stamp set, this means that the current person appears to be a good match to two previous people. In this case an even more severe similarity threshold (i.e. an even lower difference threshold) is required to match the current person to either of the two previous persons.

In addition to the similarity criterion, another criterion can help in deciding whether two face stamp sets should be merged or not. This criterion comes from the knowledge that two face stamps sets belonging to the same individual cannot overlap in time. Thus two face stamp sets which have appeared in the picture at the same time for more than a small number of frames can never be matched to each other. This is done by keeping a record of all the face stamp sets which have ever co-existed in the picture, using a co-existence matrix.

The matrix stores the number of frames for which every combination of two face stamp sets have ever co-existed. If this number is greater than a small number of frames, e.g. 10 frames (to allow for the period during which a track can sometimes float off a face for a few frames prior to being deleted), then it is not permitted to merge the two face stamp sets into the same ID. An example of a coexistence matrix for five people (tracks) numbered ID 1 to ID 5 will now be given:

|          |   | track ID |    |    |     |   |
|----------|---|----------|----|----|-----|---|
|          |   | 1        | 2  | 3  | 4   | 5 |
| track ID | 1 | 234      | 0  | 0  | 87  | 5 |
|          | 2 | 0        | 54 | 22 | 0   | 0 |
|          | 3 | 0        | 22 | 43 | 0   | 0 |
|          | 4 | 87       | 0  | 0  | 102 | 5 |
|          | 5 | 5        | 0  | 0  | 5   | 5 |

The matrix shows that:
- ID 1 has appeared for a total of 234 frames (though these may not have been contiguous). It has never appeared in shot at the same time as IDs 2 or 3, and therefore it could potentially be merged with one of these people in future. It has co-existed with ID 4 for 87 frames and so should never be merged with this person. It has also co-existed for 5 frames with ID 5. This is less than the threshold number of frames and so these two IDs can still potentially be merged together.
- ID 2 has appeared for a total of 54 frames (though these may not have been contiguous). It has only ever co-existed with ID 3, and so may not ever be merged with this person. However, it can potentially be merged with IDs 1, 4 or 5 in future, should the faces have a good match.
- ID 3 has appeared for a total of 43 frames (though these may not have been contiguous). It has only ever co-existed with ID 2, and so may not ever be merged with this person. However, it can potentially be merged with IDs 1, 4 or 5 in future, should the faces have a good match.
- ID 4 has appeared for a total of 102 frames (though these may not have been contiguous). It has never appeared in shot at the same time as IDs 2 or 3, therefore it could potentially be merged with one of these people in future. It has co-existed with ID 1 for 87 frames and so should never be merged with this person. It has also co-existed for 5 frames with face 5. This is less than the threshold number of frames and so these two IDs can still potentially be merged together.
- ID 5 has appeared for a total of just 5 frames (though these may not have been contiguous). It has co-existed with IDs 1 and 4 for all these frames, but may still be merged with either of them because this is less than the threshold. It may also be merged with IDs 2 or 3, since it has never co-existed with these IDs.

If two IDs are merged due to high face similarity, the co-existence matrix is updated by combining the co-existence information for the two merged IDs. This is done by simply summing the quantities in the rows corresponding to the two IDs, followed by summing the quantities in the columns corresponding to the two IDs.

e.g. if ID 5 were merged with ID 1, the co-existence matrix above would become:

|   | 1   | 2  | 3  | 4   |
|---|-----|----|----|-----|
| 1 | 239 | 0  | 0  | 92  |
| 2 | 0   | 54 | 22 | 0   |
| 3 | 0   | 22 | 43 | 0   |
| 4 | 92  | 0  | 0  | 102 |

If ID 1 were subsequently merged with ID 2, the co-existence matrix above would become:

|   | 1   | 3  | 4   |
|---|-----|----|-----|
| 1 | 293 | 22 | 92  |
| 3 | 22  | 43 | 0   |
| 4 | 92  | 0  | 102 |

It should be noted that:
- ID 1 cannot now be merged with any further existing people.
- A convention is used in this embodiment whereby the lowest ID number is always retained after two IDs have been merged.
- IDs are not permitted to be merged while they are both still present in the picture.

In the similarity detection process for generating and for merging face stamp sets, a face stamp typically needs to be reconstructed several times from other face stamps. This means that each block needs to be matched several times using a motion estimation method. For some motion estimation methods, the first step is to compute some information about the block that needs to be matched, irrespective of the reference face stamp used. As the motion estimation needs to be carried out several times, this information can be stored alongside the face stamp, so that it doesn't need to be calculated each time a block has to be matched, thus saving processing time.

The following description relates to improvements to the face detection and object tracking technology with the aim of improving performance on images acquired under unusual (or at least less usual) lighting conditions.

Methods to Improve Robustness to Lighting Variations

The methods used to improve robustness to lighting variations include:
(a) additional training using extra samples containing a large range of lighting variations;
(b) contrast adjustment to reduce the effect of sharp shadows.

A further enhancement, normalisation of histograms, helps in improving face detection performance as the need for tuning one parameter of the face detection system is removed.

The test sets for these experiments contain images acquired under unusual lighting conditions. The first set is labelled as "smaller training set" (curve --◆--) in FIG. 12, and contains a mixture of frontal faces (20%), faces looking to the left (20%), faces looking to the right (20%), faces looking upwards (20%) and faces looking downwards (20%). The performance of the face detection system on this test set is shown before and after these improvements in FIG. 12. The second test set contains sample images captured around the office. Sample results are shown in FIGS. 13a and 13b and are described below.

Additional Data in the Histogram Training Set

In order to cope with different lighting conditions, extra face samples can be added to the training set. These face samples preferably contain more lighting variation than the face samples in the training set originally used. As can be seen from FIG. 12, the enlarged ("Combined") training set (curve --■--) resulted in a slight improvement compared to the use of the smaller training set only (red curve).

Normalisation of Histograms

It was previously found that an appropriate threshold for detection using the histogram for the frontal pose was slightly lower than when using the histograms for the off-frontal poses. Because of this a bias had to be added to the probability maps for the frontal pose prior to combining the probability maps from each pose. This frontal bias had to be experimentally determined whenever changes were made to the histogram training component of the face detection system.

However this bias can instead be included within the histogram training component such that similar thresholds can be used for detection on both frontal and off-frontal probability maps. Thus the frontal and off-frontal histograms can be said to be normalised with respect to one another. Referring to FIG. 12, the "smaller" and "combined" curves in the graph have been generated before the experimental determination of an appropriate frontal bias. The curve --■-- was generated using normalised histograms and demonstrates that a better performance can be achieved than when a non-optimal bias is used.

Contrast Adjustment

It has been observed that faces on which sharp shadows were present were less likely to be successfully detected. Therefore a pre-processing operator was devised to try and diminish the effect of shadows. It works by centring a window (smaller than the whole image under test) around each pixel in the input image and averaging the pixel value in the centre of the window with the minimum pixel intensity value within the window. Thus the value of every pixel in the output image ($I_{output}$) is given by $$I_{output}(x) = (I_{input}(x) + \min(W))/2,$$

where W is a window centred over pixel x.

The size of the neighbourhood window used in this embodiment is 7×7 pixels. Face detection is then carried out as usual on the processed image. The improvement obtained is shown as the curve --●-- in FIG. 12. It can be seen that this novel operator has had a significant impact on the performance of the face detection system. (It is noted that a similar arrangement where the "window" comprised the whole image was tested and found not to provide this advantageous effect.

This technique is particularly useful where objects such as faces have to be detected in harsh lighting environments such as in a shop, and can therefore have application in so-called "digital signage" where faces are detected of persons viewing a video screen showing advertising material. The presence of a face, the length of time the face remains, and/or the number of faces can be used to alter the material being displayed on the advertising screen.

Sample Images

The performance of the face detection system before and after the suggested improvements on a few sample images is shown in FIGS. 13a and 13b. The images on the left and right hand sides show the result of face detection before and after the improvements respectively. As can be seen, both frontal and off-frontal faces under harsh lighting can now be successfully detected.

Although particular embodiments have been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

REFERENCES

H. Schneiderman and T. Kanade, "A statistical model for 3D object detection applied to faces and cars," IEEE Conference on Computer Vision and Pattern Recognition, 2000.

H. Schneiderman and T. Kanade, "Probabilistic modelling of local appearance and spatial relationships for object recognition," IEEE Conference on Computer Vision and Pattern Recognition, 1998.

H. Schneiderman, "A statistical approach to 3D object detection applied to faces and cars," PhD thesis, Robotics Institute, Carnegie Mellon University, 2000.

We claim:

1. A video data processing apparatus, that processes video data including a sequence of images, said apparatus comprising:
   an object tracker unit configured to detect a presence of one or more objects within an image and to track a detected object across successive images;
   an identity association unit configured to associate an identity with an object tracked by said object tracker unit;
   a counter unit configured to, for a first and second identity, count a number of images within which a tracked object associated with said first identity and a tracked object associated with said second identity have both been detected; and
   a similarity detector unit configured to determine whether two tracked objects are similar in appearance,
   wherein said identity association unit is further configured to change said identity associated with a first tracked object to said identity associated with a second tracked object if:
      said similarity detector unit determines that said first and second tracked objects are similar in appearance, and
      said count corresponding to said identities associated with said first and second tracked objects, as counted by said counter unit, is less than a predetermined threshold, and
   wherein said counter unit is further configured, when said identity association unit has changed a first identity associated with a first tracked object to a second identity associated with a second tracked object, not to count a number of images within which a tracked object associated with said first identity and a tracked object associated with any other identity have both been detected.

2. The video data processing apparatus as claimed in claim 1, wherein said objects tracked by said object tracker unit are faces.

3. A video conferencing apparatus comprising the video data processing apparatus according to claim 1.

4. A surveillance apparatus comprising the video data processing apparatus according to claim 1.

5. A video data processing apparatus, that processes video data including a sequence of images, said apparatus comprising:
   an object tracker unit configured to detect a presence of one or more objects within an image and to track a detected object across successive images;
   an identity association unit configured to associate an identity with an object tracked by said object tracker unit;
   a counter unit configured to, for a first and second identity, count a number of images within which a tracked object associated with said first identity and a tracked object associated with said second identity have both been detected; and a similarity detector unit configured to determine whether two tracked objects are similar in appearance, wherein said identity association unit is further configured to change said identity associated with a first tracked object to said identity associated with a second tracked object if:

said similarity detector unit determines that said first and second tracked objects are similar in appearance, and said count corresponding to said identities associated with said first and second tracked objects, as counted by said counter unit, is less than a predetermined threshold, and wherein said counter unit is further configured, when said identity association unit changes a first identity associated with a first tracked object to a second identity associated with a second tracked object, to increase said count associated with said second identity and a third identity by said count associated with said first identity and said third identity.

6. The video data processing apparatus as claimed in claim 5, wherein said objects tracked by said object tracker unit are faces.

7. A video data processing apparatus, that processes video data including a sequence of images, said apparatus comprising:

an object tracker unit configured to detect a presence of one or more objects within an image and to track a detected object across successive images;

an identity association unit configured to associate an identity with an object tracked by said object tracker unit;

a counter unit configured to, for a first and second identity, count a number of images within which a tracked object associated with said first identity and a tracked object associated with said second identity have both been detected; and a similarity detector unit configured to determine whether two tracked objects are similar in appearance, wherein said identity association unit is further configured to change said identity associated with a first tracked object to said identity associated with a second tracked object if:

said similarity detector unit determines that said first and second tracked objects are similar in appearance, and said count corresponding to said identities associated with said first and second tracked objects, as counted by said counter unit, is less than a predetermined threshold, and wherein said identity association unit is further configured not to change said identity associated with a first tracked object to said identity associated with a second tracked object if both said first and second tracked objects are detected in an image that is currently being processed.

8. The video data processing apparatus as claimed in claim 7, wherein said objects tracked by said object tracker unit are faces.

9. A video data processing apparatus, that processes video data including a sequence of images, said apparatus comprising:

an object tracker unit configured to detect a presence of one or more objects within an image and to track a detected object across successive images;

an identity association unit configured to associate an identity with an object tracked by said object tracker unit;

a counter unit configured to, for a first and second identity, count a number of images within which a tracked object associated with said first identity and a tracked object associated with said second identity have both been detected; and a similarity detector unit configured to determine whether two tracked objects are similar in appearance, wherein said identity association unit is further configured to change said identity associated with a first tracked object to said identity associated with a second tracked object if:

said similarity detector unit determines that said first and second tracked objects are similar in appearance, and said count corresponding to said identities associated with said first and second tracked objects, as counted by said counter unit, is less than a predetermined threshold, and wherein said similarity detector unit further comprises:

a logic division unit configured to divide an image representing one of said tracked objects into one or more test regions; and a comparator unit, configured, with respect of each test region, to compare said test region with one or more reference regions in one or more reference images representing another tracked object and for identifying said reference region that most closely matches said test region so that if said test regions were to be replaced by their correspondingly identified reference regions then said image so formed would be similar in appearance to a current image.

10. The video data processing apparatus as claimed in claim 9, wherein said objects tracked by said object tracker unit are faces.

11. A method of processing video data in a video data processing apparatus, said video data including a sequence of images, said method comprising:

detecting, at the video data processing apparatus, a presence of one or more objects within an image and tracking a detected object across successive images;

associating, at the video data processing apparatus, an identity with a tracked object;

counting, at the video data processing apparatus, for a first and second identity, a number of images within which a tracked object associated with said first identity and a tracked object associated with said second identity have both been detected; and determining, at the video data processing apparatus, whether two tracked objects are similar in appearance, wherein said associating an identity with a tracked object changes said identity associated with a first tracked object to said identity associated with a second tracked object if:

said first and second tracked objects have been determined to be similar in appearance and said count corresponding to said identities associated with said first and second tracked objects is less than a predetermined threshold, and wherein said counting, when said associating an identity has changed a first identity associated with a first tracked object to a second identity associated with a second tracked object, does not count a number of images within which a tracked object associated with said first identity and a tracked object associated with any other identity have both been detected.

12. A computer readable storage medium encoded with instructions, which when executed by a video data processing apparatus causes the video data processing apparatus to implement a method according to claim 11.

13. A method of processing video data in a video data processing apparatus, said video data including a sequence of images, said method comprising:

detecting, at the video data processing apparatus, a presence of one or more objects within an image and tracking a detected object across successive images;

associating, at the video data processing apparatus, an identity with a tracked object;

counting, at the video data processing apparatus, for a first and second identity, a number of images within which a tracked object associated with said first identity and a tracked object associated with said second identity have both been detected; and determining, at the video data processing apparatus, whether two tracked objects are similar in appearance, wherein said associating an identity with a tracked object changes said identity associated with a first tracked object to said identity associated with a second tracked object if:

said first and second tracked objects have been determined to be similar in appearance and said count corresponding to said identities associated with said first and second tracked objects is less than a predetermined threshold, and wherein said counting, when said associating an identity changes a first identity associated with a first tracked object to a second identity associated with a second tracked object, increases said count associated with said second identity and a third identity by said count associated with said first identity and said third identity.

14. A computer readable storage medium encoded with instructions, which when executed by a video data processing apparatus causes the video data processing apparatus to implement a method according to claim 13.

15. A method of processing video data in a video data processing apparatus, said video data including a sequence of images, said method comprising:

detecting, at the video data processing apparatus, a presence of one or more objects within an image and tracking a detected object across successive images;

associating, at the video data processing apparatus, an identity with a tracked object;

counting, at the video data processing apparatus, for a first and second identity, a number of images within which a tracked object associated with said first identity and a tracked object associated with said second identity have both been detected; and determining, at the video data processing apparatus, whether two tracked objects are similar in appearance, wherein said associating an identity with a tracked object changes said identity associated with a first tracked object to said identity associated with a second tracked object if:

said first and second tracked objects have been determined to be similar in appearance and said count corresponding to said identities associated with said first and second tracked objects is less than a predetermined threshold, and wherein said associating does not change said identity associated with a first tracked object to said identity associated with a second tracked object if both said first and second tracked objects are detected in an image that is currently being processed.

16. A computer readable storage medium encoded with instructions, which when executed by a video data processing apparatus causes the video data processing apparatus to implement a method according to claim 15.

17. A method of processing video data in a video data processing apparatus, said video data including a sequence of images, said method comprising:

detecting, at the video data processing apparatus, a presence of one or more objects within an image and tracking a detected object across successive images;

associating, at the video data processing apparatus, an identity with a tracked object;

counting, at the video data processing apparatus, for a first and second identity, a number of images within which a tracked object associated with said first identity and a tracked object associated with said second identity have both been detected; and determining, at the video data processing apparatus, whether two tracked objects are similar in appearance, wherein said associating an identity with a tracked object changes said identity associated with a first tracked object to said identity associated with a second tracked object if:

said first and second tracked objects have been determined to be similar in appearance and said count corresponding to said identities associated with said first and second tracked objects is less than a predetermined threshold, and wherein said determining comprises:

dividing an image representing one of said tracked objects into one or more test regions; and comparing, with respect of each test region, said test region with one or more reference regions in one or more reference images representing another tracked object and for identifying said reference region that most closely matches said test region so that if said test regions were to be replaced by their correspondingly identified reference regions then said image so formed would be similar in appearance to a current image.

18. A computer readable storage medium encoded with instructions, which when executed by a video data processing apparatus causes the video data processing apparatus to implement a method according to claim 17.

\* \* \* \* \*